Patented Dec. 19, 1933

1,940,146

UNITED STATES PATENT OFFICE 1,940,146

PROCESS OF PURIFYING PHENOLPHTHALEIN

Harold P. Roberts, Nitro, W. Va., assignor to Kavalco Products, Inc., Nitro, W. Va., a corporation of West Virginia No Drawing. Application July 15, 1930
Serial No. 468,210

8 Claims. (Cl. 260—65)

The present invention relates to improvements in processes of purifying the phenolphthalein and has for its object simplicity and economy in procedure and a high grade of purity of product.

Crude phenolphthalein is produced in the ordinary way by the condensation of phthalic anhydride with phenol in the presence of a condensing agent, such as sulphuric acid, anhydrous zinc chloride, anhydrous aluminum chloride, anhydrous tin chloride, etc. Regardless of the condensing agent used, this condensation is never perfect, with the result that there are formed more or less amounts of colored and tarry or resinous by-products, which greatly interfere with the subsequent purification or refining of the crude phenolphthalein. A method, most commonly employed to effect purification of the crude phenolphthalein, is to dissolve the condensate, after being washed with water, in a caustic soda or soda ash solution, filter the solution to remove fluorane bodies, by-products also formed during the reaction of condensation, and subsequently precipitate the phenolphthalein by an acid. The resulting material is dried, and then further treated to free it of tarry substances as follows: Dry fluorane-free phenolphthalein is dissolved in alcohol or other solvent, using a decolorizing carbon in the solution, the latter is boiled and then filtered, and the phenolphthalein crystallized from solution, whereafter the amounts of phenolphthalein obtained from this initial crystallization are re-crystallized from solution as often as is necessary, and usually many times, to produce a product of the required purity.

A great difficulty, experienced by reason of the colored and resinous by-products, is in filtering the alcohol solution after the decolorizing boil. These by-products tend to act as a colloid and make is extremely difficult to filter out the colored substances, and the filter cloths are clogged up so badly that in some cases, even with 150 pounds pressure, it is impossible to effect filtration, thereby necessitating frequent cleaning of the filter press and entailing great loss of time and material. As an illustration of this inconvenience, in one instance the press had to be cleaned 21 times in filtering a solution of 1000 pounds of recrystallized phenolphthalein. Another serious disadvantage, caused by the colored tarry by-products, is the ineffectiveness of a single crystallizing operation or a few crystallizing operations to produce a product which is sufficiently white in color, sufficiently free from resinous bodies and which possesses a sufficiently high melting point, to attain the required standard, so that increased labor, considerable loss of time and material are caused by the large number of purifications necessary to produce an acceptable product.

The present invention aims to produce a phenolphthalein material containing a minimum of colored and tarry substances prior to the step of dissolving this phenolphthalein material in a solvent from which the product is crystallized. In this way, the solution from which the product is crystallized may be filtered without difficulty. Also, fewer crystallizations are required to produce the final product, and the process as a whole is facilitated.

It has been determined that the resinous by-products are much more soluble in a soda ash solution than phenolphthalein. Thus, in accordance with the invention, the crude material resulting from the reaction of condensation is treated with a soda ash solution in such manner that only a relatively small amount of phenolphthalein is extracted from the crude material, but that an undissolved product remains which may then be processed to free it of by-products with practically no difficulty whatever. By adjusting the quantity of soda ash and the conditions of extraction, all or the greater part of the resinous products can be removed, but in so doing a greater quantity of phenolphthalein is extracted. Consequently, there should be maintained an economic balance, wherein a small quantity of resinous substances, not enough to cause trouble in the alcohol treatment, is left in the treated product and not too much phenolphthalein is taken into the extract. Moreover, the soda ash extract may be in turn extracted with more soda ash, and satisfactory phenolphthalein obtained from the residue. The soda ash extract containing the resinous substance is a very active laxative and may be so employed.

A method which may be used for the production of phenolphthalein with increased yield of phenolphthalein, consists in condensing phthalic anhydride and phenol in the presence of anhydrous zinc chloride and a relatively small amount of concentrated sulphuric acid. The following proportions may be used: 376 pounds of phenol, 296 pounds of phthalic anhydride, 200 pounds of anhydrous zinc chloride, and 20 pounds of sulfuric acid (66° Bé.). The ingredients are charged into a suitable non-ferrous container, such as a steam-jacketed glass-enamelled kettle, and heated therein with agitation for about 13 hours. The reaction mixture is then made into a slurry by adding hot water. This slurry is then run into a tub, and the condensate well washed with hot water until zinc chloride, phenol and phthalic acid are absent. The condensate is then ready for purification.

A satisfactory method, by which the soda ash extraction may be conducted in accordance with the present invention, is as follows: 500 pounds of crude phenolphthalein (calculated to dry condensate), 25 pounds of soda ash and 475 gallons of water are placed in a suitable apparatus, such as an iron tank equipped with coils for steam or cooling water and with a stirring device. The mixture is boiled vigorously for four hours, and may thereafter be pumped through a filter press to separate the soda ash extract from the residue. The process of purification of the residue, consisting mainly of phenolphthalein, may then proceed in any well known manner as above outlined, the quantity of resinous substance remaining in the material being not enough to interfere with the proper filtration of the alcohol solution from which the product is crystallized.

For instance, the residue, after washing, may be returned to the iron tank which has served for the soda ash extraction, and dissolved therein in a soda ash solution, in the proportions of 100 grams of residue (calculated to a dry basis) to 40 grams of sodium carbonate per litre of water. The mixture is then vigorously boiled until there is obtained a thorough solution of phenolphthalein. The solution is then filtered. The filter cake may be washed. It contains the relatively small amounts of fluorane bodies which were produced as by-products during the reaction of condensation. The filtrate is diluted to contain 40 to 50 grams of phenolphthalein per litre. This diluted solution is cooled and then run into such amount of a 20% sulphuric acid solution as to effect precipitation of the phenolphthalein. The precipitated material is filtered, washed thoroughly and dried. The dry material may then be dissolved in ethyl alcohol in the proportion of 100 grams to 600 cubic centimeters of solvent. A good decolorizing carbon is added to the solution in the proportion of 4 grams per 100 grams of phenolphthalein. The solution is refluxed under boiling for one hour, and it is then filtered and the filtrate concentrated by boiling off two-thirds of the alcohol. On cooling, phenolphthalein crystallizes out from the solution. The sludge is centrifuged and washed with alcohol. Since a product meeting with the requirements of the U. S. Pharmacopoeia is desired, the material is recrystallized, if necessary, until a product of the required purity is obtained.

The extract, resulting from the soda ash extraction of the crude phenolphthalein, may be accumulated, and phenolphthalein precipitated therefrom by an acid. The precipitate may be again partially extracted with soda ash in the same manner as the crude phenolphthalein. In this way, serious losses of phenolphthalein are prevented.

It has been found that, instead of soda ash, the carbonates or bicarbonates of the alkali metals and ammonium may be used in the partial extraction of the resinous impurities. Since bicarbonates, when boiled, are converted into carbonates with accompanying formation of carbon dioxide, care must be taken, when using the bicarbonates, to boil out or otherwise remove the carbon dioxide, as the latter tends to precipitate phenolphthalein from solution.

The process herein described makes possible high yields of pure phenolphthalein in a comparatively short time. No inconvenience is experienced in filtering the alcohol solution from which the product is crystallized, and fewer crystallizations from alcohol are required to produce a product substantially white in color, free of fluorane and resinous by-products and having a melting point of 256° C. or over.

What is claimed is:

1. In a process of purifying phenolphthalein of resinous impurities, the step consisting in treating impure phenolphthalein with a soda ash solution to remove resinous impurities therefrom.

2. In a process of purifying phenolphthalein of resinous impurities, the step consisting in extracting a partial amount of resinous impurities from the impure product by treatment of the latter with a solution of an alkali metal carbonate.

3. A process of removing resinous impurities from phenolphthalein comprising forming a phenolphthalein residue by extraction of such impurities from the impure product with a solution of an alkali metal carbonate.

4. A process of removing resinous impurities from phenolphthalein resulting from a condensation of phthalic anhydride and phenol, comprising boiling a solution of soda ash containing impure phenolphthalein in the proportions of substantially 500 pounds of impure phenolphthalein to 25 pounds of soda ash in 475 gallons of water to separate resinous impurities from phenolphthalein.

5. The method of purifying phenolphthalein having resinous impurities therein, which includes, treating the phenolphthalein with an alkali carbonate without dissolving any substantial amount of phenolphthalein.

6. The method of purifying phenolphthalein having resinous impurities therein, which includes, treating the phenolphthalein with an insufficient amount of alkali carbonate to dissolve the phenolphthalein, but sufficient amount to dissolve substantially all the resinous impurities.

7. In the process of purifying phenolphthalein having resinous impurities therein, the step consisting in treating such impure phenolphthalein with an alkali carbonate solution in which the resinous impurities are more soluble than phenolphthalein to remove resinous impurities therefrom.

8. In the process of purifying phenolphthalein employing crystallization of the product from a solvent, the step, prior to removing resinous impurities from the solvent from which the product is crystallized, consisting in extracting resinous impurities from the impure product by treatment of the latter with a dilute alkali carbonate solution in which the resinous impurities are more soluble than phenolphthalein.

HAROLD P. ROBERTS.